United States Patent [19]
Imai

[11] Patent Number: 6,038,369
[45] Date of Patent: *Mar. 14, 2000

[54] SIGNAL RECORDING METHOD AND APPARATUS, RECORDING MEDIUM AND SIGNAL PROCESSING METHOD

[75] Inventor: Kenichi Imai, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,260

[22] Filed: Sep. 8, 1997

[30] Foreign Application Priority Data

Sep. 10, 1996 [JP] Japan .................................. P08-239422

[51] Int. Cl.⁷ .................................................. H04N 5/91
[52] U.S. Cl. ................................ 386/95; 386/122; 360/22
[58] Field of Search ................................. 386/36, 95, 96, 386/99, 100, 104, 105, 106, 122, 109, 111, 112; 360/22, 23; 369/47, 48, 54, 58; 348/398

[56] References Cited

U.S. PATENT DOCUMENTS

| | | |
|---|---|---|
| 5,151,941 | 9/1992 | Nishiguchi et al. ...................... 381/46 |
| 5,204,677 | 4/1993 | Akagiri et al. ........................... 341/118 |
| 5,264,846 | 11/1993 | Oikawa ..................................... 341/76 |
| 5,268,685 | 12/1993 | Fujiwara .................................. 341/76 |
| 5,301,205 | 4/1994 | Tsutsui et al. .............................. 375/1 |
| 5,311,561 | 5/1994 | Akagiri .................................... 375/122 |
| 5,377,051 | 12/1994 | Lane et al. ............................. 360/33.1 |
| 5,414,795 | 5/1995 | Tsutsui .................................. 395/2.13 |
| 5,471,558 | 11/1995 | Tsutsui .................................. 395/2.28 |
| 5,490,170 | 2/1996 | Akagiri et al. ........................... 375/240 |
| 5,553,193 | 9/1996 | Akagiri .................................. 395/2.38 |
| 5,579,404 | 11/1996 | Fielder et al. .......................... 381/106 |
| 5,642,111 | 6/1997 | Akagiri ..................................... 341/50 |
| 5,664,056 | 9/1997 | Akagiri ................................... 704/229 |
| 5,687,157 | 11/1997 | Imai et al. ............................... 369/124 |

FOREIGN PATENT DOCUMENTS

| | | |
|---|---|---|
| 0458645 A2 | 11/1991 | European Pat. Off. .......... H04B 1/66 |
| 0497413 A1 | 8/1992 | European Pat. Off. .......... H04B 1/66 |
| 0506394 A2 | 9/1992 | European Pat. Off. .......... G10L 7/00 |
| 0525809 A2 | 2/1993 | European Pat. Off. .......... H04B 1/66 |
| 0570131 A1 | 11/1993 | European Pat. Off. .......... H04B 1/66 |
| 0615349 A2 | 9/1994 | European Pat. Off. .......... H04B 1/66 |
| 7-147742 | 6/1995 | Japan ............................... H02J 9/06 |
| WO 90/09022 | 8/1990 | WIPO ............................ G11B 20/10 |

OTHER PUBLICATIONS

F. Jelinek, "Buffer Overflow in Variable Length Coding of Fixed Rate Sources," IEEE Transactions of Information Theory, vol. IT–14, No. 3, May 1968, pp. 490–501.

(List continued on next page.)

Primary Examiner—Thai Tran
Assistant Examiner—Christopher Onuaku
Attorney, Agent, or Firm—Limbach & Limbach LLP; Seong-Kun Oh

[57] ABSTRACT

A signal recording method for recording a signal having improved sound quality while maintaining interchangeability with the pre-existing format for a digital audio disc or the like. An input signal to a signal recording device is a signal obtained on sampling with the sampling frequency exceeding 4.1 kHz and/or a signal having the number of quantization bits exceeding 16. The input signal is split by a band-splitting filter 3 into a main signal which is a 16-bit signal and a plurality of sub-signals of the frequency range other than the above frequency. Each sub-signal has its priority set by a priority calculating unit 5. The sub-signals are synthesized in the order of the decreasing priority to an inaudible area of the main signal as found by a required bit number calculating unit 4.

129 Claims, 9 Drawing Sheets

OTHER PUBLICATIONS

B. Atal et al., "Predictive Coding of Speech Signals," Reports of the 6th Int'l Congress on Acoustics, Aug. 21–28, 1968, Tokyo, pp. C13–C16.

D. Huffman, "A Method for the Construction of Minimum–Redundancy Codes," Proceedings of the I.R.E., vol. 40, No. 2, Feb. 1952, pp. 1098–1101.

J. Ziv et al., "A Universal Algorithm for Sequential Data Compression," IEEE Transactions on Information Theory, vol. IT–23, No. 3, May 1977, pp. 337–343.

J. Rothweiler, "Polyphase Quadrature Filters—A New Subband Coding Technique," ICASSP Apr. 14–16, 1983, vol. 3 of 3, pp. 1280–1283.

M. Smith et al., "Exact Reconstruction Techniques for Tree–Structured Subband Coders," IEEE Transactions on Acoustics, Speech and Signal Processing, vol. ASSP–34, No. 3, Jun. 1986, pp. 434–441.

R.E. Crochiere et al. "Digital Coding of Speech in Sub-Bands," The Bell System Technical Journal, vol. 55, No. 8, Oct. 1976, pp. 1069–1085.

J. Princen et al., "Subband/Transform Coding Using Filter Bank Designs Based on Time Domain Aliasing Cancellation," ICASSP Apr. 6–9, 1987, IEEE, vol. 4, pp. 2161–2164.

P. Vaidyanathan, "Multirate Digital Filters, Filter Banks, Polyphase Networks, and Applications: A Tutorial," Proceedings of the IEEE, vol. 78, No. 1, Jan. 1990, pp. 56–93.

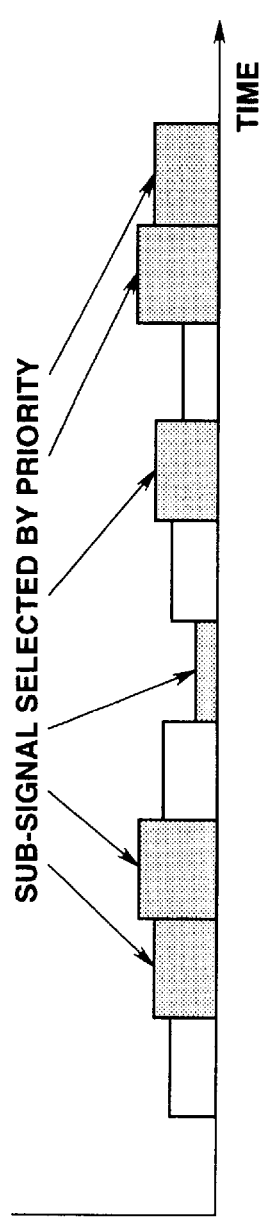
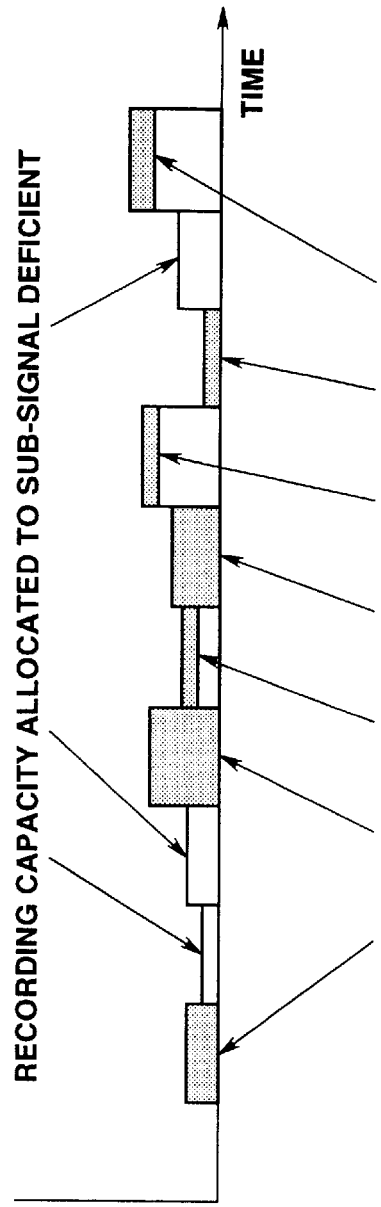
FIG.9A
FIG.9B

SIGNAL RECORDING METHOD AND APPARATUS, RECORDING MEDIUM AND SIGNAL PROCESSING METHOD

BACKGROUND OF THE INVENTION

1. Field of the Invention

This invention relates to a signal recording method, a signal recording device, a recording medium and a signal processing method for digital audio data.

2. Description of the Related Art

In a format for a compact disc, as a digital audio disc, the sampling frequency is set to 44.1 kHz, so that the maximum reproducible frequency is set at 22.05 kHz. The quantization bits are set to 16 bits, with the dynamic range being approximately 98 dB.

Meanwhile, a sound source, such as gamlan or yodel-voice, is known to contain a significant amount of frequency components exceeding the maximum reproducible frequency of the digital audio disc such that the sampling frequency of 44.1 kHz is insufficient.

Recently, the digital/analog (D/A) converter is improved in accuracy and now can handle signals of weak intensity, such that the dynamic range of approximately 98 dB obtained for the quantization bits of 16 bits of the digital audio disc also has become insufficient.

Thus it may be contemplated to increase the sampling frequency or the number of quantization bits beyond those used in the conventional practice to improve the sound quality to produce broad frequency band or broad dynamic range signals for recording on a disc (recording medium) of the size of the conventional digital audio disc.

It is technically possible to record signals sampled with the sampling frequency higher than 44.1 kHz on a disc of the size of the conventional digital audio disc or to record data having the number of quantization bits larger than 16 by narrowing the track pitch on the recording disc or by shortening the wavelength of the laser light beam of the optical pickup.

However, if the device or the recording medium is modified for raising the recording capacity for improving the sound quality, it becomes impossible to maintain interchangeability with respect to the format of the conventional digital audio disc thus confusing the software market.

The present Assignee has proposed in the Japanese Patent Application 7-147742 (1995) a method of recording a sound source exceeding the conventional frequency band without modifying the format of the conventional digital audio disc for maintaining interchangeability. The frequency band herein means not only the usual frequency band but also the band of the quantization noise in S/N. The signal recording method proposed in this prior art resides in encoding the playback range of the conventional digital audio disc by straight PCM and in encoding the remaining areas as sub-areas by high-efficiency encoding. The signal portion in the playback range of the conventional digital audio disc inaudible to the human ear is detected for synthesizing the signal information of the above-mentioned sub-signals thereon. In this case, if the signal recorded by the above method is reproduced in accordance with the format of the conventional digital audio disc, the signal components of the conventional frequency band can be reproduced. If a playback device used can reproduce the sub-area as well, the reproduced sound can be improved in sound quality.

This method cannot be applied satisfactorily in case the volume of the sub-area signals is large since then the information cannot be recorded in its entirety.

SUMMARY OF THE INVENTION

It is therefore an object of the present invention to provide a signal recording method, a signal recording device, a recording medium and a signal processing method whereby signals can be recorded with improved sound quality while maintaining interchangeability with the format of the conventional digital audio disc.

In one aspect, the present invention provides a signal recording method including the steps of splitting the entire area of an input signal into a main area and a plurality of sub-areas, generating a main signal for the main area and a plurality of sub-signals for the sub-areas, setting priority for each of the sub-signals, finding an allowable signal area of the main signal in which noise superimposition does not affect the playback signal of the main signal, sequentially selecting the sub-signals synthesized to the main signal in the sequence of the decreasing priority within the range of the capacity of the allowable signal area and synthesizing the selected sub-signal to the allowable signal area of the main signal for recording the main signal to which the sub-signal has been synthesized.

In another aspect, the present invention provides a signal recording method including the steps of partitioning an input signal in terms of pre-set time units for forming units, splitting the entire area of the input signal in which the units have been formed into a main area and a plurality of sub-areas, setting priority to each sub-signal, generating a main signal for the main area and a plurality of sub-signals for the sub-areas, finding an allowable signal area of the main signal noise superimposition on which does not affect the playback signal of the main signal, sequentially selecting the sub-signals synthesized to the main signal in the sequence of the decreasing priority within the range of the capacity of the allowable signal area and synthesizing the selected sub-signal to the allowable signal area of the main signal having a smaller distance of the unit associated with the sub-signal for recording the main signal to which the sub-signal has been synthesized.

In still another aspect, the present invention provides a signal recording apparatus including splitting means for splitting the entire area of an input signal into a main area and a plurality of sub-areas and for generating a main signal for the main area and a plurality of sub-signals for the sub-areas, priority setting means for setting priority for each of the sub-signals of the sub-bands split by the splitting means, allowable signal area calculating means for calculating, from the main signal as split by the splitting means, an allowable signal area of the main signal noise superimposition on which does not affect the playback signal of the main signal, sub-signal selecting means for sequentially selecting the sub-signals synthesized in the allowable signal range in the decreasing sequence of the priority as set by the priority setting means within the range of the capacity of the allowable signal area as calculated by the allowable signal area calculating means and recording means for synthesizing the sub-signal selected by the sub-signal selecting means to the allowable signal area of the main signal as calculated by the calculating means for calculating an allowable signal area of the main signal for recording the main signal to which the sub-signal has been synthesized.

In still another aspect, the present invention provides a signal recording apparatus including unit-forming means for partitioning an input signal in terms of pre-set time units for forming units, splitting means for splitting the entire area of the input signal in which the units have been formed into a main area and a plurality of sub-areas for generating a main signal for the main area and a plurality of sub-signals for the sub-areas, priority setting means for setting priority for each of the sub-signals split by the splitting means, allowable signal area calculating means for calculating, from the main signal as split by the splitting means, an allowable signal area of the main signal noise superimposition on which does not affect the playback signal of the main signal, sub-signal selecting means for sequentially selecting the sub-signals synthesized to the allowable signal area in the decreasing sequence of the priority as set by the priority setting means within the range of the capacity of the allowable signal area as calculated by the allowable signal area calculating means and recording means for synthesizing the sub-signal selected by the sub-signal selecting means to the allowable signal area of the main signal as found by the allowable signal area calculating means for recording the main signal to which the sub-signal has been synthesized, the signal area having a smaller distance of the unit associated with the sub-signal.

The sub-signals, obtained on splitting the input signal, partitioned in terms of pre-set time units to form units, by splitting means, have priority set by priority setting means. The sub-signals, having priority set thereon, are selected by sub-signal selection means in the order of decreasing priority within the range of the capacity of the allowable signal area of the main signal as found by the allowable signal area calculating means so as to be synthesized to the allowable signal area of the main signal. In synthesizing the sub-signals to the main signal, the sub-signal having higher priority is recorded in the unit of the main signal having the smaller distance. The signal area of the main signal having the sub-signal synthesized thereto is not changed from that before synthesis.

In still another aspect, the present invention provides a recording medium having recorded thereon signals made up of a main signal of a main area and a plurality of sub-signals of sub-areas, the main area and the sub-areas resulting from splitting the entire area. The sub-signals having the relative priority set thereto is synthesized in the order of decreasing priority to an allowable signal area of the main signal the noise superposition on which does not affect the playback signals.

In still another aspect, the present invention provides a recording medium having recorded thereon signals made up of a main signal of a main area and a plurality of sub-signals of sub-areas, the signals being partitioned in terms of a pre-set time units to form units, the main area and the sub-areas resulting from splitting the entire area. The sub-signals having the relative priority set thereto is synthesized in the order of decreasing priority to a portion of an allowable signal area of the main signal having a smaller distance of the unit associated with the sub-signal, the noise superposition to the allowable signal area portion not affecting the playback signals.

In still another aspect, the present invention provides a signal processing method including the steps of splitting the entire area of an input signal into a main area and a plurality of sub-areas, generating a main signal for the main area and a plurality of sub-signals for the sub-areas, setting priority for each of the sub-signals, finding an allowable signal area in a signal area of the main signal noise superimposition on which does not affect the playback signal of the main signal, sequentially selecting the sub-signals synthesized to the allowable signal area in the order of decreasing priority within the range of the capacity of the allowable signal area and synthesizing the selected sub-signal to the allowable signal area of the main signal.

In yet signal processing method including the steps of partitioning an input signal in terms of pre-set time units for forming units, splitting the entire area of the input signal in which the units have been formed into a main area and a plurality of sub-areas for generating a main signal for the main area and a plurality of sub-signals for the sub-areas, setting priority for each of the sub-signals, finding an allowable signal area, in a signal area of the main signal, noise superimposition on which does not affect the playback signal of the main signal, sequentially selecting the sub-signals synthesized to the allowable signal area in the sequence of the decreasing priority within the range of the capacity of the allowable signal area and synthesizing the selected sub-signal to the allowable signal area of the main signal having a smaller distance of the unit associated with the sub-signal.

With the signal recording method and apparatus according to the present invention, the sound quality may be improved by using a dedicated signal reproducing device while interchangeability with the pre-existing digital audio disc format is maintained. In addition, the acoustically crucial signal portion can be recorded efficiently.

Also, when the recorded signal is reproduced by the signal reproducing device, it becomes possible to realize scalability, that is the varying magnitude of the sub-signals reproducible with the size of the buffer memory provided in the signal reproducing device.

With the recording medium and the signal processing method according, to the present invention, interchangeability with the pre-existing digital audio disc format can be maintained and the sound quality improved by using a dedicated signal reproducing device for playback, while the acoustically essential portion can be recorded efficiently. In addition, in reproducing the recorded signal by the signal reproducing device, it becomes possible to realize scalability of varying the size of the sub-signals reproducible by the size of the buffer memory provided in the signal reproducing device.

BRIEF DESCRIPTION OF THE DRAWINGS

FIG. 9A and 9B illustrate the allocating method when a data packing unit of the signal recording device of the present invention synthesizes sub-signals to a main signal unit.

DESCRIPTION OF THE PREFERRED EMBODIMENTS

Figure 1:
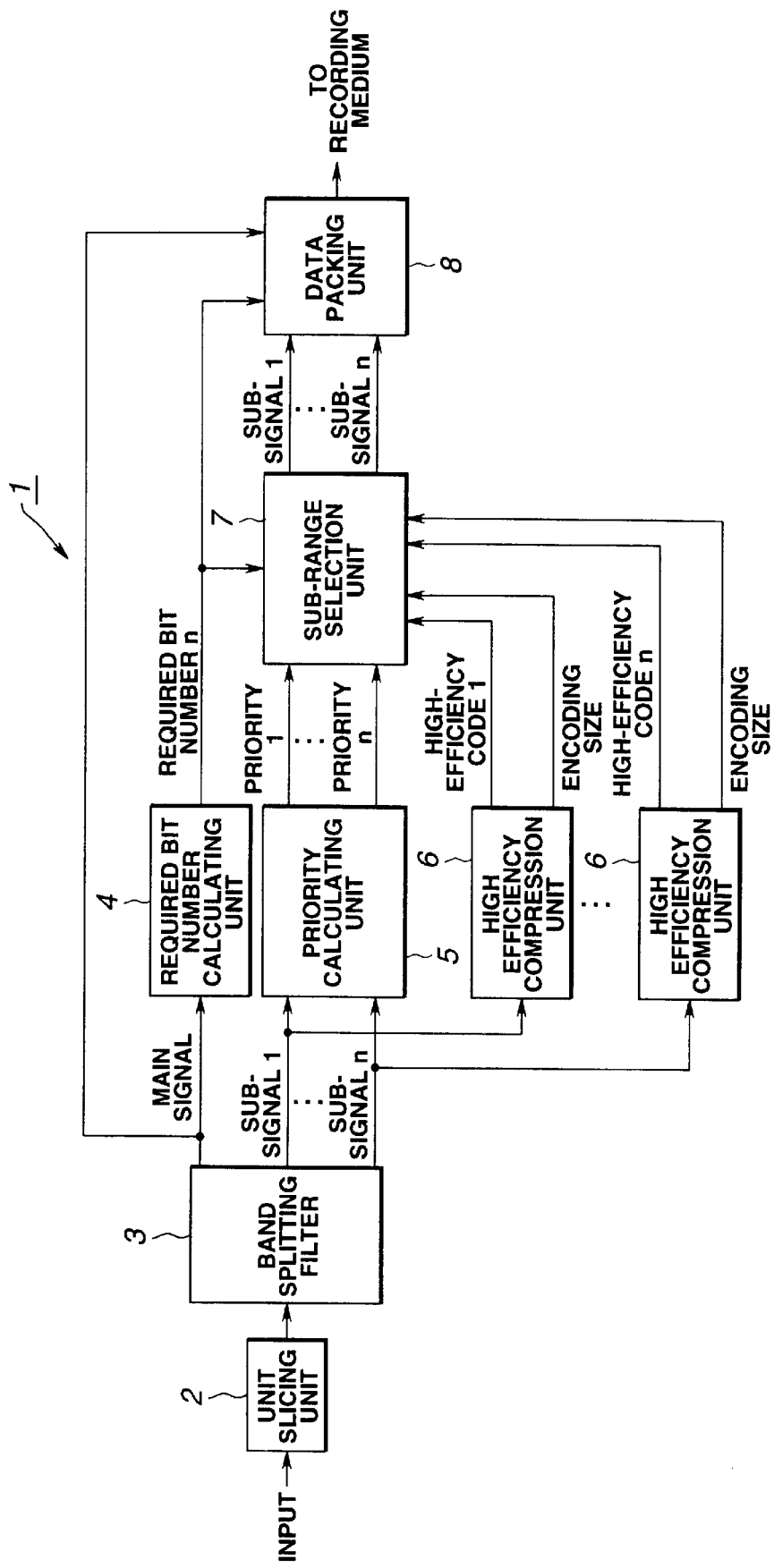
FIG. 1 is a block diagram of a signal recording device according to the present invention.

Referring to the drawings, preferred embodiments of the present invention will be explained in detail.

The signal recording device according to the present invention is such a device in which, the signal obtained with the sampling frequency exceeding 44.1 kHz and/or the signal having the number of quantization bits exceeding 16, that is the signal improved in sound quality beyond the conventional digital audio disc signal, is recorded as an input signal on a digital audio disc whilst the interchangeability with the format of a conventional digital audio disc is maintained. The digital audio disc as a recording medium is hereinafter referred to simply as a recording medium.

FIG. 1 shows a block diagram of a signal recording device 1 according to the present invention. The signal recording device 1 includes a unit slicing unit 2, a band-splitting filter 3, a calculation unit 4 for calculating the required number of bits 4, a priority calculating unit 5, a high-efficiency compressing unit 6, a sub-band selecting unit 7, and a data packing unit 8.

The input signal to the signal recording device 1 is a digital audio signal such as speech or acoustic signal. This digital audio signal is a signal obtained for the sampling frequency exceeding 44.1 kHz and/or a signal having the number of quantization bits exceeding 16, that is a signal of higher sound quality than the signal provided by the digital audio disc format. This digital audio signal is entered to the unit slicing unit 2 of the signal recording device 1.

Since the unit slicing unit 2 splits the input digital audio signal in terms of plural samples as a unit for handling the split signal on the unit basis. Although the unit size is arbitrary, the digital audio disc format provides that 588 samples per channel forms a unit termed a block, so that the unit is preferably a multiple of 588 samples. The processing downstream of the unit slicing unit 2 is carried out on the unit basis. The digital audio signal units, processed by the unit slicing unit 2, are sent to the band-splitting filter 3.

The band-splitting filter 3 splits the input signal, which is a signal obtained with the sampling frequency exceeding 44.1 kHz and/or the signal having the number of quantization bits exceeding 16, into a main signal of 44.1 kHz and 16 bits, which is a digital audio disc format signal, and a sub-signal which is a frequency band signal exceeding the digital audio signal format. Meanwhile, the sub-signal is at least one or more signal and is band-split into one or more sub-signals for each main signal.

For band-splitting, there a method of splitting the signal in the direction of the frequency axis and a method of splitting the signal in the direction of quantization bits. Specified examples of band splitting are hereinafter explained.

A first specified example of the band-splitting method band-splits a signal having a frequency band of 44.1 kHz, obtained on sampling with 88.2 kHz, into three signals, namely a main signal having a frequency range of 0 to 22.05 kHz, a sub-signal having a frequency range of 22.05 33.075 kHz and a sub-signal having a frequency range of 33.075 to 44.1 kHz.

Figure 2:
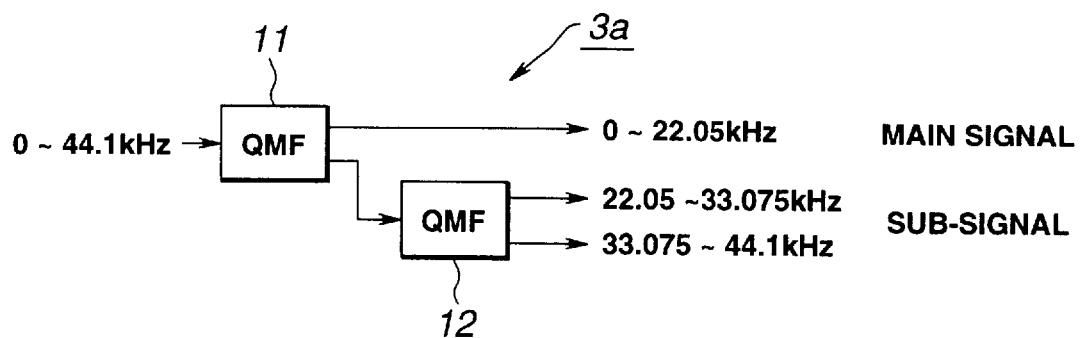
FIG. 2 is a block diagram of a band-splitting filter of a signal recording device according to the present invention.

The first specified example is implemented by a band-splitting filter 3a shown in FIG. 2. The input signal is entered to a quadrature mirror filter (QMF) 1 as later explained. The filter 11 splits the frequency band into two to decimate the number of samples by one half to output the decimated signal. The input signal is split by the filter 11 comprised of the QMF into a signal having a band of 0 to 22.05 kHz and a signal of a band of from 22.05 to 44.1 kHz. The signal of 22.05 to 44.1 kHz is aliased towards the low range side. The signal of the frequency band of from 0 to 22.05 kHz forms a main signal of the digital audio disc format. On the other hand, the signal of the frequency range of from 22.05 to 44.1 kHz is entered to a filter 12 which is also a QMF. Similarly to the filter 11, the filter 12 processes the input 22.05 to 44.1 kHz signal to split the signal into a signal of the frequency band of from 22.05 to 33.075 kHz and a signal of the frequency band of from 33.075 to 44.1 kHz to output the two signals. These two signals form the sub-signals.

Discussions on the QMF may be found in R. E. Crochiere, 'Digital Coding of Speech in Sub-Bands', Bell Syst. Tech. J. Vol.55, No.8, 1976.

Figure 3:
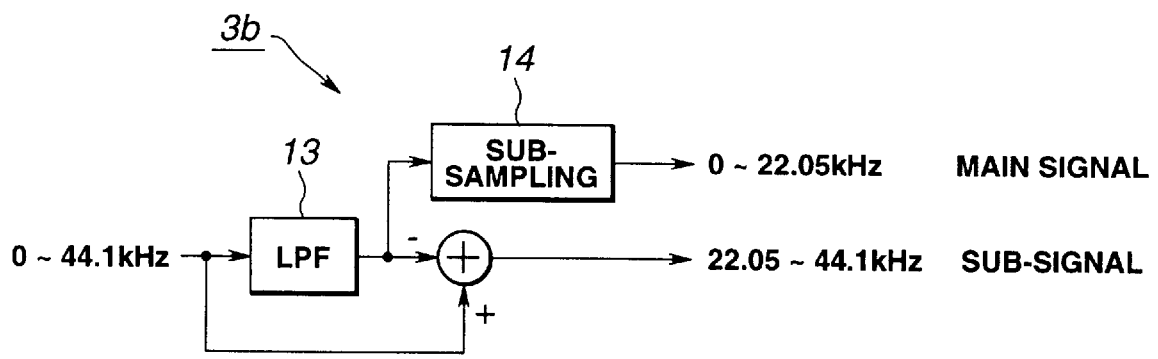
FIG. 3 is again a block diagram of a band-splitting filter of a signal recording device according to the present invention.

The above-described may also be implemented by a band-splitting filter 3b shown in FIG. 3 using the low-pass filter 13 bin place of the QMF. If the low-pass filter 13 is used, the decimated output such as that obtained by the QMF is not obtained. Therefore, the sampling frequency of the main signal is 88.2 kHz. Thus the main signal is sub-sampled by a sub-sampling circuit 14 so that even-numbered or odd-numbered samples are outputted. Although the band-splitting filter 3b is shown to form only a sub-signal, plural sub-signals may also be produced by using plural low-pass filters as shown in FIG. 2.

As the band-splitting filter, the conjugate quadrature filters (CQF) discussed in Mark J. T. Smith and Thomas P. Barnwell, IEEE Trans. ASSP, Vol. ASSP-34 No.3, June 1986, picture processing.434–441 "Exact Reconstruction Techniques for Tree-Structured Subband Coders" or the equal-band-width filter splitting method as discussed in Joseph H. Rothweiler, ICASSP 83, BOSTON, "Polyphase Quadrature Filters- A New Subband Coding Technique" may also be used in addition to the above-mentioned QMF or low-pass filters. Meanwhile, the CQF can impeccably reconstruct the signal using a non-linear phase filter. The polyphase quadrature filter features splitting the signal into plural bands once and for all.

A second specified example of the band-splitting method is a method of splitting the dynamic range by the number of quantization bits. An input signal of the present second example is a 20-bit signal which is split into a 16-bit dynamic range and a 4-bit dynamic range.

Figure 4:
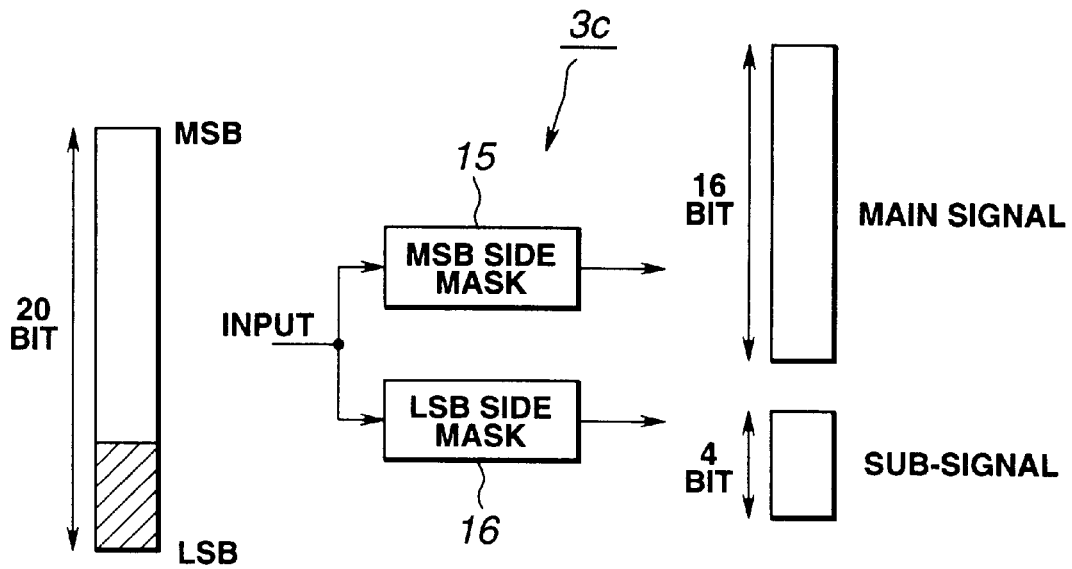
FIG. 4 is also a block diagram of a band-splitting filter of a signal recording device according to the present invention.
Figure 5:
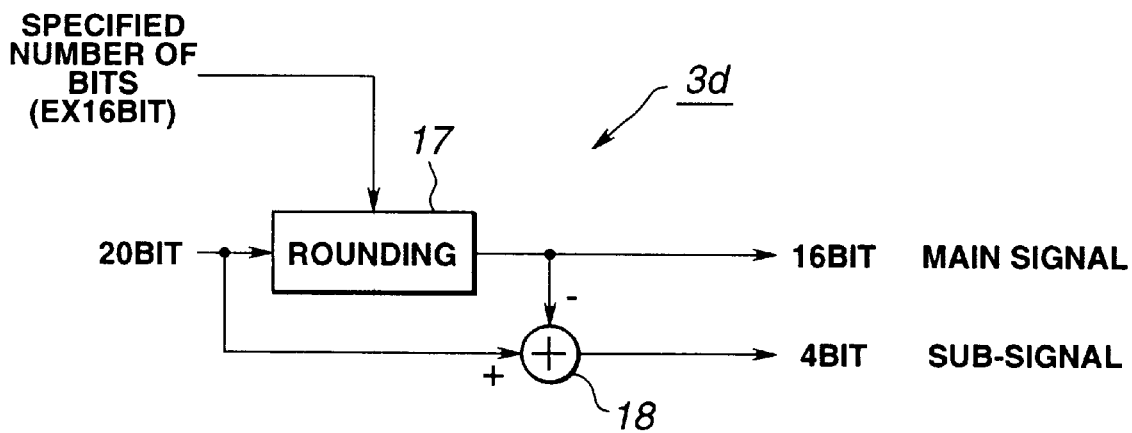
FIG. 5 is a block diagram of a band-splitting filter of a signal recording device according to the present invention.

The second specified example is implemented by a band-splitting filter 3c shown in FIG. 4 or a band-splitting filter 3d shown in FIG. 5. The band-splitting filter 3c shown in FIG. 4 simply splits the 20-bit input signal into 16 bits provided in the digital audio disc format. An MSB side mask 15 masks the most significant bit (MSB) of the input signal to output the main signal. Masking herein means setting 1 for each of the 16 bits from the MSB side to carry out AND operations. An LSB side mask 16 masks the least significant bit (LSB) side of the input signal to output the sub-signal. In a band-splitting filter 3d shown in FIG. 5, a rounding circuit 17 rounds the 20-bit input signal to 16 bits. The rounding herein means dividing the input signal by 4-bit size followed by half-adjustment. This division by the 4-bit size followed by half-adjustment is effective for reducing the quantization error caused by re-quantization. The difference between the re-quantized output and the input signal is found by an adder 18 to obtain a 4-bit difference signal. The 16-bit signal is the main signal while the 4-bit signal is the sub-signal.

The band-splitting filter 3 may be configured to have both the functions of the first and second specified examples. This can be realized by cascade-connecting a structure implementing the method of band splitting in the direction of the frequency axis shown in FIGS. 2 and 3 and a structure implementing the method of band splitting in the direction of the quantization bits shown in FIGS. 4 and 5.

Thus, the band-splitting filter 3 can split the output signal of the unit slicing unit 2 by the above-described specified examples into the main signal and the sub-signal.

The main signal split by the band-splitting filter 3 is routed to the required bit number calculating unit 4 and to the data packing unit 8. The sub-signals split by the band-splitting filter 3 is routed to the priority calculating unit 5 and the high-efficiency compression unit 6.

The required bit number calculating unit 4 finds the required number of bits capable of maintaining the psychoacoustic sound quality on the occasion of reproducing the main signal. By finding the required number of bits, it can be judged which information volume of the sub-signals synthesized to the main signal as later explained can be synthesized. Stated differently, if a signal obtained on synthesizing the sub-signals to the main signal having acquired the required number of bits is reproduced in accordance with the conventional digital audio signal format, the sub-signal proves to be the perceptually allowable noise, so that the sound quality of the main signal is compensated as conventionally.

Figure 6:
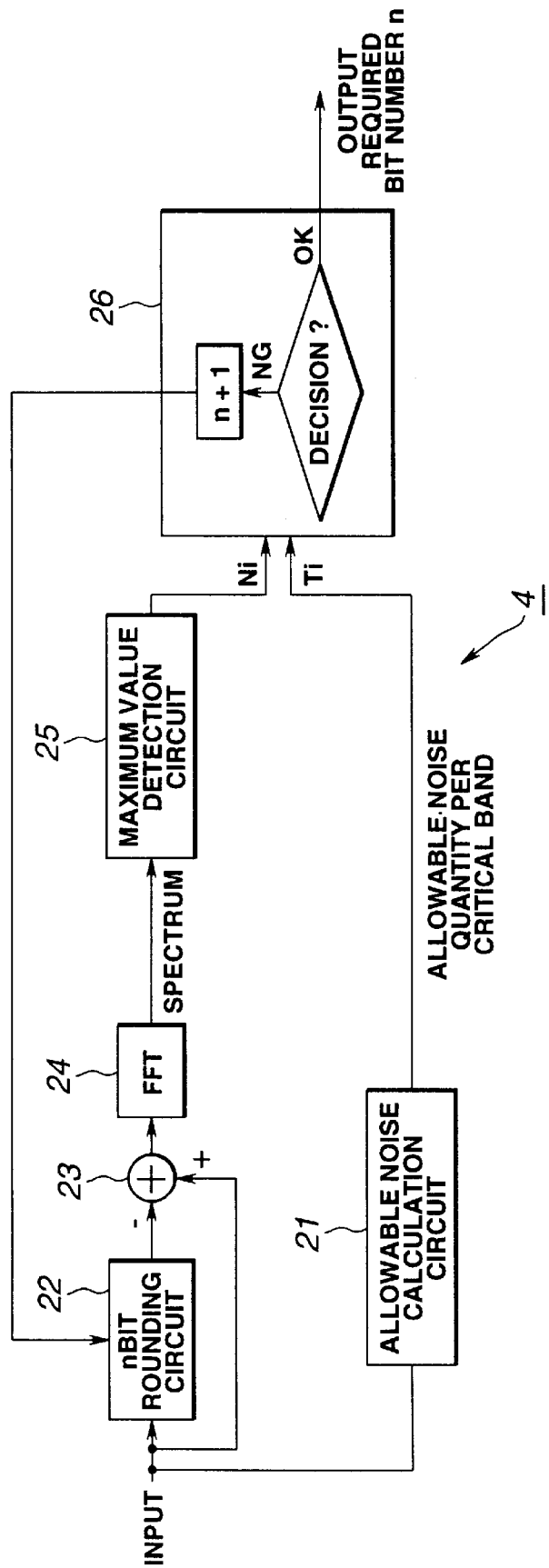
FIG. 6 is a block diagram of a calculating unit for calculating the required number of bits of a signal recording device according to the present invention.

The required bit number calculating unit 4 is implemented by a structure as shown in FIG. 6. The required bit number calculating unit 4 is made up of an allowable noise quantity calculating circuit 21, an n-bit rounding circuit 22, an adder 23, an FFT processing unit 24, a maximum value detection circuit 25 and a required bit number judgment circuit 26. The main signal, an input signal to the required bit number calculating unit 4, is routed to an allowable noise quantity calculating circuit 21, an n-bit rounding circuit 22 and to an adder 23.

The allowable noise quantity calculating circuit 21 is a circuit for finding the allowable noise quantity Ti from one critical band of the main signal to another. The allowable noise quantity means the lowermost perceptual threshold value of the noise which becomes imperceptible in the presence of a signal. The allowable noise quantity calculating circuit 21 fast Fourier transforms the main signal, splits the resulting frequency domain signal into critical bands and synthesizes the minimum audibility curve and the masking spectrum from one critical band to another. It is noted that the minimum audibility curve plots the threshold value of the sensitivity of the human ear, and the masking means the phenomenon in which a signal becomes masked by another signal and becomes inaudible. The critical band is the frequency band obtained on splitting the frequency spectrum taking psychoacoustic characteristics of the human being into account and denotes the band of noise that can be masked by a pure sound that has the same intensity as the noise and has a frequency in the vicinity of the frequency of the noise. The width of the critical band increases with increasing frequency of the pure sound. The entire audio frequency range is split into, for example, 25 critical bands. An illustrative circuit for finding the allowable noise level is shown in Japanese Patent Application 7-147742 proposed by the present Assignee.

The allowable noise volume Ti of each critical band, as found by the allowable noise quantity calculating circuit 21, is routed to the required bit number judgment circuit 26.

The n-bit rounding circuit 22 rounds the number of bits of the input main signal with a pre-set number of bits (n bits), that is divides the input signal by (16-n) and half-adjusts the resulting value. The pre-set number of bits set to a value corresponding to the smallest allowable bit number value on the occasion of reproduction of the main signal and may for example be 12.

After rounding the main signal by n bits, the adder 23 finds the difference from the main signal prior to rounding by n bits by the adder 23. An output signal is the quantization noise produced on rounding the main signal in n bits. This quantization noise is routed to the FFT processing circuit 24.

The FFT processing circuit 24 fast Fourier transforms the quantization noise to find the spectrum of the quantization noise. This quantization noise spectrum is routed to the maximum value detection circuit 25.

From the quantization noise spectrum, the maximum value detection circuit 25 finds the maximum value Ni of the spectrum of each critical band. The maximum value Ni of the spectrum of each critical band is sent to the required bit number judgment circuit 25.

To the required bit number judgment circuit 25 are entered the allowable noise volume value Ti of each critical band and the maximum value Ni of the spectrum of the quantization noise volume of each critical band.

The required bit number judgment circuit 25 compares these two values from one critical band to another to determine whether Ti>Ni for each critical band. If Ti>Ni for each critical band, n is outputted as the required number of bits. If Ti>Ni does not hold for one the critical bands, n is lengthened by one bit and the maximum value Ni of the spectrum of the quantization noise quantity is again found from one critical band to another. Instead of re-finding the maximum number Ni by lengthening n by one bit, the minimum value may be found from Ti and the required number of bits calculated from this minimum value, because the quantization noise level is increased by approximately 6 dB if the word length is shortened by one bit.

The required number of bits n of the main signal outputted by the above-mentioned required bit number calculating unit 4 is sent to the sub-area selection unit 7.

On the other hand, the sub-signals outputted by the band-splitting filter 3 are sent to the priority calculating unit 5 and to the high-efficiency compression unit 6.

The priority calculating unit 5 sets the relative priority of the sub-signals. The reason the relative priority is set for the sub-signals is as follows: The recording device according to the present invention is characterized by synthesizing the information of the sub-signals in the noise area of the main signal capable of maintaining psychoacoustic sound quality at the time of reproduction of the main signal. However, limitations are imposed on the area in which to record the sub-signals, so that it is necessary to set the relative priority to the sub-signals and to effect synthesis of the sub-signals to the main signal in the order of decreasing relative priority.

The priority calculating unit 5 sets the relative priority of each sub-signal based on pre-set parameters. The parameter governing the relative priority of each sub-signal may for example be a sub-signal area. If the sub-signal is split by the frequency axis method, higher priority is put on the lower frequency side, whereas, if the sub-signal is split by the number of quantization bits, higher relative priority is put as the MSB is approached. The reason is that higher relative priority needs to be put towards the range closer to the audible range and towards the side of higher weight of quantization.

It is also possible to calculate the entropy of each sub-signal to put higher relative priority on the side of higher entropy. The use of entropy as the parameter leads to a feature that it becomes possible to predict the code length of the encoded signal in case of effecting entropy coding such as Huffman coding. If the probability of occurrence of the information source symbol of each information source desired to be encoded is Pi and the number of the information sources is M, the entropy H is found by the following equation (1):

$$H = -\sum_{i=1}^{M} P_i \log_2 P_i \quad (1)$$

At this time, the average code length L of the information source is given by the following equation (2):

$$L \geq h \quad (2)$$

This renders it possible to predict the code length of the encoded signal. By setting the relative priority based on the magnitude of entropy and the value of the code length, it becomes possible to use the higher relative priority on more crucial signals or to signals recordable more easily.

Such a method may also be used in which correlation between each sub-signal and the main signal is found to allocate higher relative priority to a band exhibiting higher correlation. If the sub-signal is found in the direction of the frequency axis, such a method may also be used in which the band spectrum is found and the higher relative priority is put towards the side of a larger energy sum because the signal with a larger spectrum energy sum is felt to be more crucial.

The high-efficiency compression unit 6 compresses each sub-signal outputted by the band-splitting filter 3 for reducing the recording capacity to as small a value as possible for improving the recording efficiency. Examples of the methods for the high-efficiency compression unit 6 to compress the sub-signal information include reversible encoding capable of completely regenerating the original information and irreversible encoding incapable of completely regenerating the original information.

The irreversible encoding may be exemplified by entropy encoding such as so-called Huffman encoding. The entropy coding encodes respective sample values based on an encoding table of allocating the codes to respective sample values. The Huffman encoding is discussed in D.A. Huffman, "A Method for Construction of Minimum Redundancy Codes", Proc. I.R.E., 40, picture processing. 1098, 1952). The entropy encoding includes, in addition to the Huffman encoding, Lempel-Ziv encoding, as discussed in J. Ziv.. A. Lempel, "A Universal Algorithm for Sequential Data Compression", IEEE Trans., on Inform. Theory, Vol. IT-23, No.3, pp. 337 to 343, 1977), and an arithmetic encoding as discussed in F. Telinek, "Buffer Overflow in Variable Length Coding of Fixed Rate Sources", IEEE Trans. Inform. Theory, Vol. IT-14, No.3, pp. 490 yo 501, 1968.

For irreversible coding, efficient information compression of taking out and recording only perceptually critical information may be used. As this method, the encoding system proposed in the Japanese patent Application N-.7-147742 filed in the name of the present Assignee may be used. Encoding may also be by non-linear quantization, such as ADPCM, or by vector quantization. It is also possible to compress the information encoded by these methods by entropy coding. Discussion on LPC may be found in an Extended Abstract by Itakura and Saito et al. to the Japan Society of Acoustics, entitled "Speech resolution Synthesis Transmission System by the Maximum Likelihood Estimation Method", pp. 231, 1967 and in an Extended abstract by B. S. Atal and M. A. Schroeder entitled "Reports of Sixth Int. Conf. Acoust., C-5-4, 1968. There are a number of publications on the calculation algorithm not enumerated herein for simplicity.

No matter which compression technique is used, the amount of as-compressed information, that is the number of bits thereof, is found in terms of the encoding size.

The relative priority of the sub-signals outputted by the priority calculating unit 5 and the high-efficiency encoded sub-signals outputted by the high-efficiency compression unit 6 with the encoding size of the sub-signals are routed to the sub-area selection unit 7.

Based on the required number of bits n outputted by the required bit number calculating unit 4, the relative priority outputted by the priority calculating unit 5 and the sub-signal and its encoding size outputted by the high-efficiency compression unit 6, the sub-area selection unit 7 selects the sub-signals that can be synthesized to the main signal. The sub-area selection unit 7 selects the sub-signals beginning from the sub-signals of the highest priority until depletion of the recording capacity for sub-signals. Specifically, the encoding size as found at the time of the high-efficiency encoding is subtracted in an amount corresponding to the recordable capacity. The recordable capacity is obtained on subtracting, from the recording capacity of the entire unit, the recording capacity required for the main signal as found from the required number of bits n. If the sub-signals of higher relative priority cannot be recorded because of the excessive recording capacity, it is possible to select the sub-signal that is low in the rank of relative priority but is small in recording capacity and hence is recordable. The above-mentioned selected sub-signal is supplied to the data packing unit 8.

The data packing unit 8 synthesizes the main signal outputted by the band-splitting filter 3 to the sub-signals outputted by the sub-area selection unit 7 to produce a signal of a 16-bit word length of the digital audio disc format. At this time, the sub-signal is recorded from the side of the LSB of the main signal so as to be synthesized to the main signal. The data packing unit 8 outputs the main and sub-signals, synthesized together by the digital audio disc format, to a modulation circuit, not shown, for recording on a recording medium.

Consequently, audio data recorded by the signal recording device 1 on the recording medium as described above can be reproduced by the usual digital audio disc reproducing device. The fact that the data can be reproduced by the usual digital audio disc reproducing device means that the main signal can be reproduced. That is, since the main signal and the sub-signals are recorded on the same data area, the sub-signal proves to be the noise for the main signal if the main signal is reproduced by the usual digital audio disc reproducing device. However, since the sub-signal has been recorded in the inaudible signal area of the main signal, the sub-signals cannot be heard psychoacoustically. It is also effective to re-array the data so that the sub-signal proves to be non-correlative with respect to the main signal to avoid main signal corruption during recording as far as possible.

It is also possible to reproduce both the main signal and the sub-signals to regenerate the sound to a higher sound quality than is possible with the conventional digital audio disc format. In such case, a dedicated signal reproducing device is required.

Figure 7:
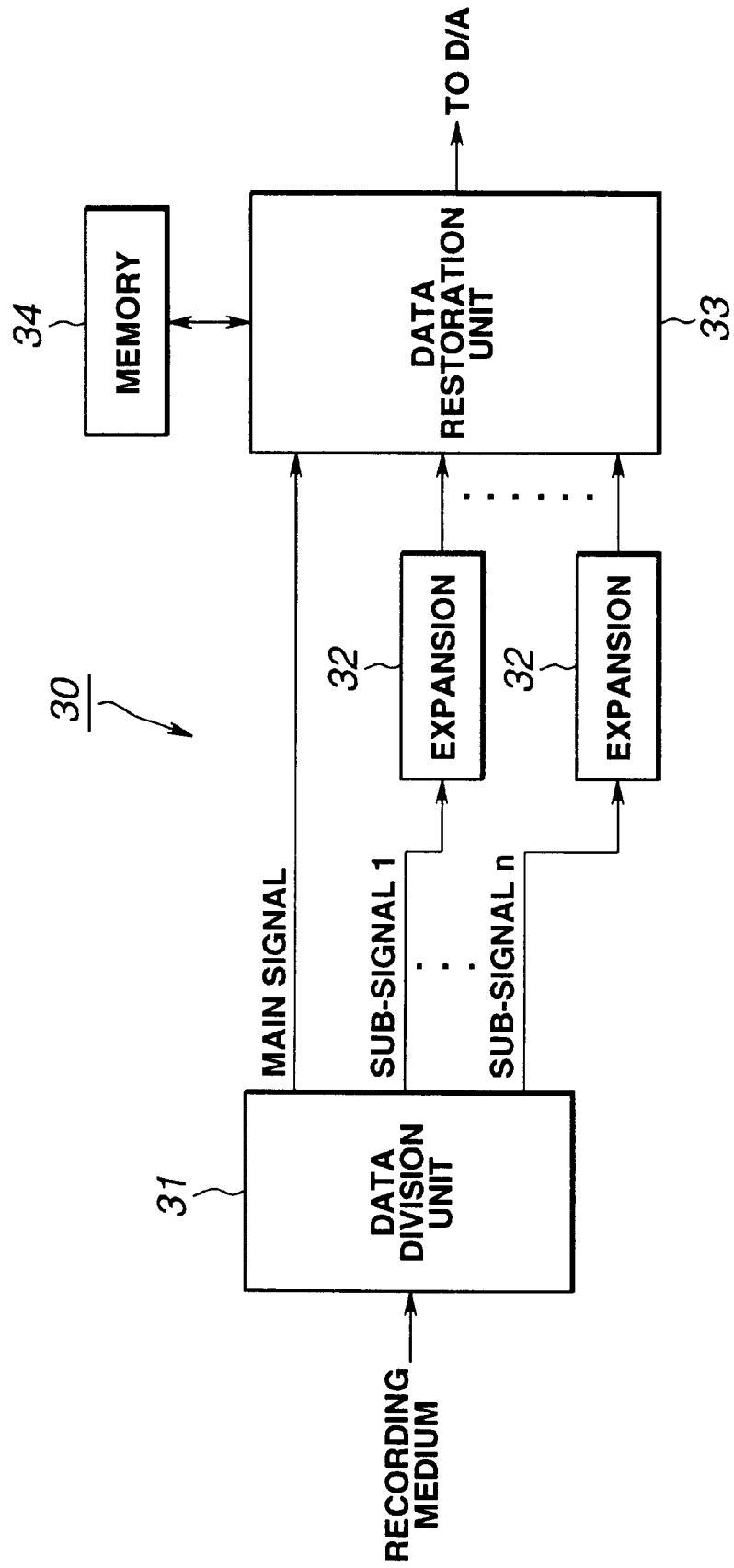
FIG. 7 is a block diagram of a signal reproducing device.

FIG. 7 shows a block diagram of a signal reproducing device 31. The signal reproducing device 31 includes a data division unit 31, a data expansion unit 32, a data restoration unit 33 and a memory 34.

The signal reproducing device 30 reads out the main signal and the sub-signals from a recording medium having these main signal and sub-signals recorded thereon and reproduces a signal of higher quality than is possible with the pre-set format of the digital audio disc.

The signals recorded on the signal recording device 1 are read out by a pickup, not shown, and thence supplied to the data division unit 31, which then divides the signal synthesized from the main signal and the sub-signals into the main signals and plural sub-signals both of which are outputted. The main signal is sent to the data restoration unit 33, while the sub-signals are supplied to the expansion unit 32.

The expansion unit 32 expands the compressed sub-signals. At this time, the expansion unit 32 has to decode the sub-signals by decoding as a counterpart operation of encoding used by the high-efficiency compression unit 6 of the signal recording device 1. The expanded sub-signals are sent to the data restoration unit 33.

The data restoration unit 33 decodes from the split main signal and sub-signals audio signals of higher sound quality than is possible with the pre-set digital audio disc format. If the main signal is split from the sub-signals in the frequency domain by the band-splitting filter 3 of the signal recording device 1, restoration is to a signal having the number of quantization bits of 16 and the sampling frequency of 44.1 kHz or higher. If the main signal is split from the sub-signals by the dynamic range of the quantization bits, restoration is to a signal having the number of quantization bits of 16 or more and the sampling frequency of 44.1 kHz. The data restoration unit 33 temporarily stores the main signal and the sub-signals in the memory 34 at the time of data restoration for synchronization. The audio signal outputted by the data restoration unit 33 is outputted from for example a speaker via a D/A converter, not shown.

A second embodiment, modified from the above-described embodiment, is hereinafter explained.

In the above-described embodiment, priority setting for the sub-signals is completed within one unit sliced by the unit slicing unit 2. However, there are occasions wherein the information volume of the sub-signal of a given unit is larger or that of the sub-signal of another unit is smaller than the information volume of the sub-signals allocated to the main signal. In this case, the information of the sub-signals can be recorded in its entirety in a given unit, while that in another unit cannot be recorded in its entirety, thus leading to a poor recording efficiency. Therefore, in this second embodiment, the sub-signals are recorded in temporally offset plural units.

Figure 8:
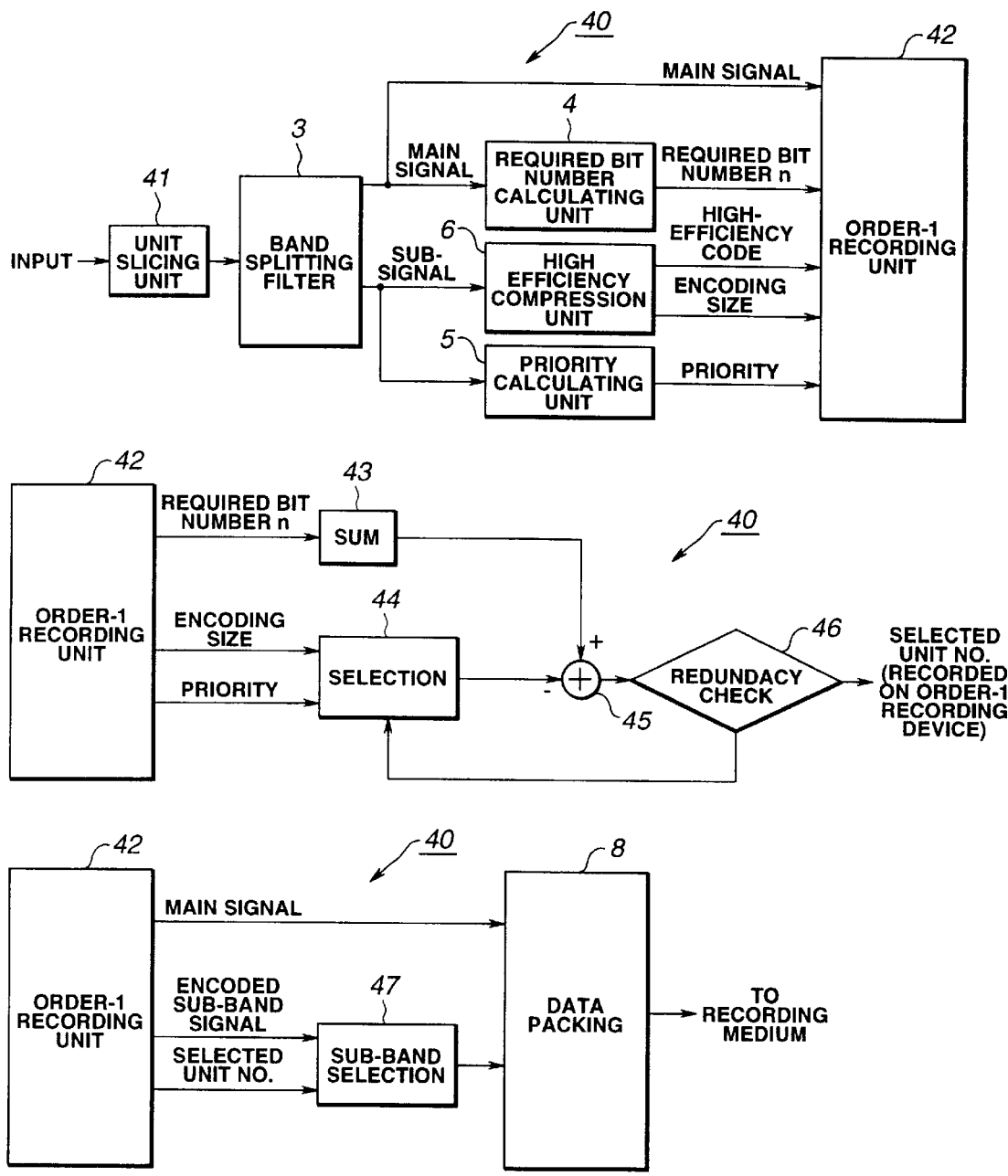
FIG. 8 is a block diagram of a signal recording device according to the present invention.

FIG. 8 shows a block diagram of a signal recording device 40 as a second embodiment of the present invention. In the structure of the second embodiment, parts or components similar in structure to the first embodiment are depicted by the same reference numerals and are the corresponding description is omitted for simplicity.

In recording data in a package medium, such as a digital audio disc, real-time recording is not critical. Thus the operation of the signal recording device 40 may be such that several information data are previously found across all of signal items to be processed and are processed and outputted in accordance with the information items by a plurality of stage paths. Therefore, the signal recording device 40 is explained on the basis of plural stage paths.

The first path is explained. Audio data of higher sound quality than is provided in the format of the digital audio disc for an input signal is entered to a unit slicing unit 41. The unit slicing unit 41 slices several samples as a unit. The unit slicing unit 41 finds the information for temporal exchange of the sliced units and appends the information to each unit. The information for temporal exchange may be found for a range of all signals to be recorded on the recording medium or from one track to another.

The sliced unit is split by the band-splitting filter 3 into the main signal and the sub-signals. In the following explanation, the sub-signal is assumed to be a sole signal.

The main signal, as split by the band-splitting filter 3, is sent to the required bit number calculating unit 4 in order to find the required number of bits n in case of reproduction of the main signal. The sub-signal, as split by the band-splitting filter 3, is sent to the priority calculating unit 5 for calculating the relative priority and to the high-efficiency compression unit 6 for effecting high compression for producing the high-efficiency codes an the encoding size. The above-mentioned main signal, required number of bits n, the high-efficiency encoded sub-signal, the encoding size of the sub-signal and the relative priority are sent to a 1-order recording device 42 for storage of the signals temporally therein for use in the subsequent paths. The 1-order recording device 42 is adapted for recording on a hard disc or magneto-optical disc (MO disc) as a recording medium. The main signal itself may also be recorded on the 1-order recording device 42.

The second path is explained. A summation unit 43 finds from the required number of bits n as found in the first path the sum total of the number of bits for the entire recording medium or each track which is comprised within a range of appending the unit time information in the above-mentioned unit slicing unit 41 and finds the sum total of the number of bits usable for recording the sub-signal by subtraction from the recording capacity of the recording medium. The priority selection unit 44 also finds the total number of bits on encoding the sub-signal of the highest priority unit. The sum total of the number of bits usable for recording the sub-signal and the total number of bits as found on encoding the sub-signals of the highest priority unit are routed to an adder 45.

The adder 45 subtracts from the total number of bits usable for the sub-signal the total number of bits which is obtained on encoding the sub-signal having the highest priority. The redundancy check unit 46 then checks whether or not there is any redundancy in the recording capacity. If there is no redundancy in the recording capacity, the relative priority as selected by the priority selection unit 44 is recorded in the 1-order recording device 42. If there is any redundancy, the total number of bits until the next relative priority is again selected in the priority selection unit 44 for subtraction of the total number of bits thus selected from the total number of bits usable for the sub-signal by the adder 45. This operation is repeated until no redundancy is found by the redundancy check unit 46. The above sequence of operations selects only the sub-signal of the high priority unit.

The third path is explained. The sub-area selection unit 47 outputs the sub-signal synthesized with the main signal based on the unit of the priority as selected in the second path. The main signal and the sub-signal selected by the sub-area selection unit 47 are routed to the data packing unit 8.

Figure 10:
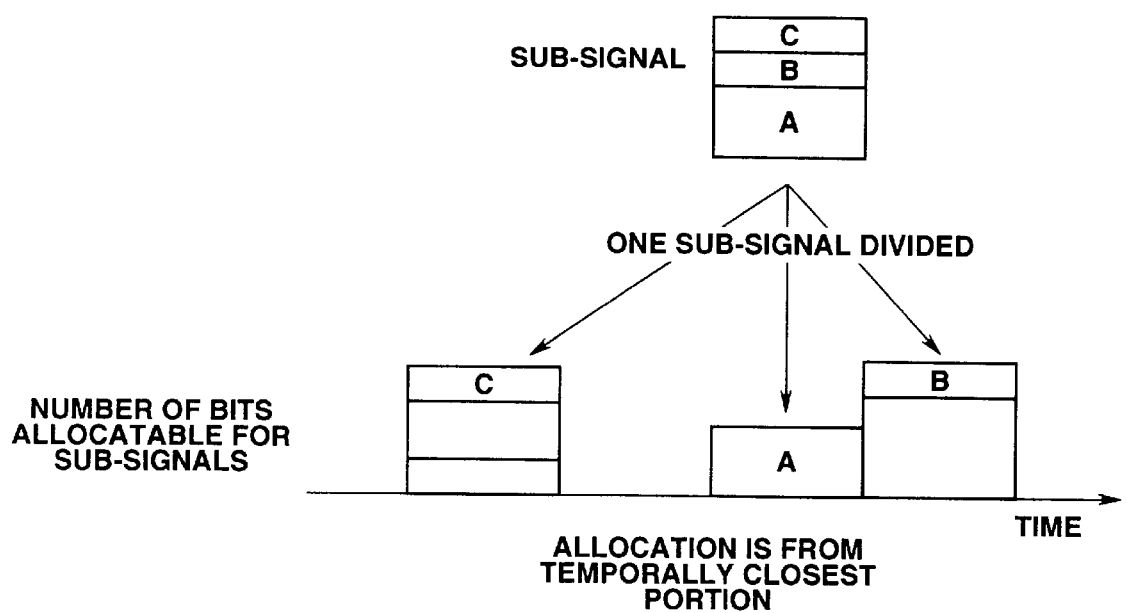
FIG. 10 illustrates the allocating method when a data packing unit of the signal recording device of the present invention synthesizes sub-signals to a main signal unit.

Similarly to the signal recording device 1, the data packing unit 8 synthesizes the main signal and the sub-signal. Referring to FIG. 9, the sub-signal is recorded in many cases in temporally different main signal units, such that, if plural sub-signals are recorded in temporally different units, the sole sub-signal is recorded in plural different units. Consequently, the data packing unit 8 records the sub-signals beginning from the temporally closer main signal unit, as shown in FIG. 10. If a sole sub-signal has plural units, the units with higher relative priority are recorded in temporally close positions.

Figure 11:
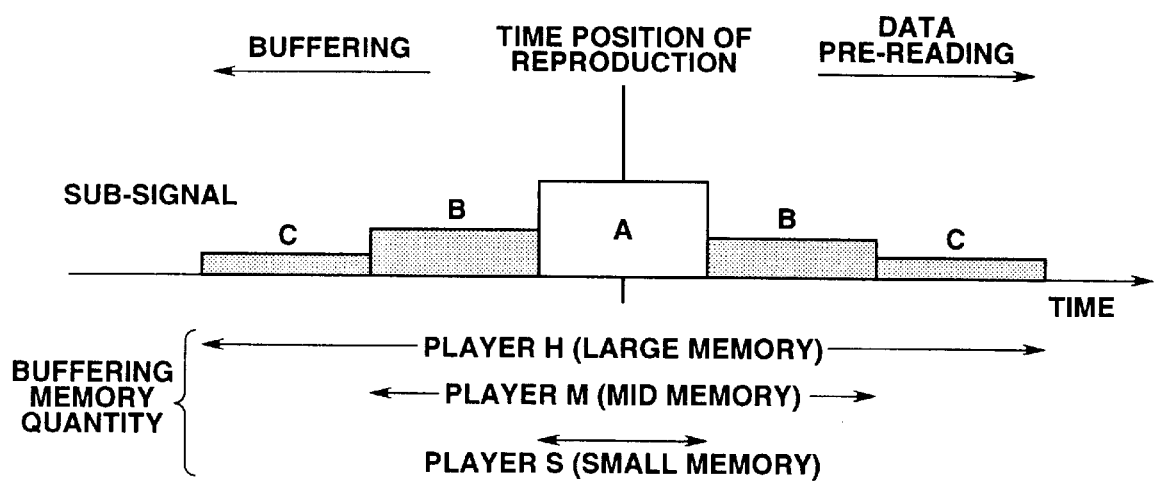
FIG. 11 illustrates scalability when the data recorded by the signal recording device according to the present invention is reproduced by the signal reproducing device.

Therefore, the signal recording device 40 can reproduce data recorded by, for example, the signal reproducing device 30 shown in FIG. 7. In this case, recording can be carried out for realizing scalability as shown in FIG. 11. The scalability herein means that the reproducible range can also be rendered variable depending on the size of the memory of the signal reproducing device.

Therefore, with the signal reproducing device, data pre-reading or buffering is required for temporal data exchange in reproducing data recorded by the signal recording device 40, so that a memory to this end is required. If the sub-signal having higher priority is recorded at a temporally closer position, as described above, it becomes possible to reproduce only the most crucial sub-signal in a signal reproducing device with a small memory for buffering, while all sub-signals can be reproduced for a signal reproducing device having a large memory.

Although the digital audio disc is given as an example in the above-described embodiment, it is also possible to enter an input signal of higher sound quality than the main signal by having the above-mentioned main signal associated with the pre-set format. The present invention may be applied to, for example, a package media of digital audio such as an audio tape, or to signal transmission, such as broadcasting.

The present system can also be applied not only to an audio signal but also to picture signals. In this case, the signal of a higher quality than is prescribed in the pre-set format for the picture signals is split into the main signal and the sub-signal. The sub-signal is synthesized to the main signal. The signal area of the main signal to which the sub-signal is synthesized is an area of the signal which is not deleterious from the viewpoint of visual sense.

What is claimed is:

1. A signal recording method comprising the steps of:
   splitting the entire area of an input signal into a main area and a plurality of sub-areas;
   generating a main signal for the main area and a plurality of sub-signals for said sub-areas;
   setting priority for each of the sub-signals;
   finding an allowable signal area of the main signal in which noise superimposition does not affect the playback signal of the main signal;
   sequentially selecting the sub-signals synthesized to said main signal in the sequence of the decreasing priority within the range of the capacity of the allowable signal area; and
   synthesizing the selected sub-signal to the allowable signal area of the main signal for recording the main signal to which the sub-signal has been synthesized, wherein the synthesized selected sub-signal is variably scalable during the playback signal of the main signal.

2. The signal recording method as claimed in claim 1 wherein said input signal is an audio signal and wherein the allowable signal area of the main signal which does not affect the playback signal of the main signal on noise superimposition thereon is a psycho-acoustically non-deleterious signal area.

3. The signal recording method as claimed in claim 1 wherein said input signal is a video signal and wherein the allowable signal area of the main signal which does not affect the playback signal of the main signal on noise superimposition thereon is a visually non-deleterious signal area.

4. A signal recording method comprising the steps of:
   splitting the entire area of an input signal into a main area and a plurality of sub-areas;
   generating a main signal for the main area and a plurality of sub-signals for said sub-areas;
   setting priority for each of the sub-signals;
   finding an allowable signal area of the main signal in which noise superimposition does not affect the playback signal of the main signal;
   sequentially selecting the sub-signals synthesized to said main signal in the sequence of the decreasing priority within the range of the capacity of the allowable signal area; and
   synthesizing the selected sub-signal to the allowable signal area of the main signal for recording the main signal to which the sub-signal has been synthesized, wherein said input signal is a signal of a broad frequency range sampled at a sampling frequency higher than the sampling frequency of the main signal; and wherein the main signal is a low frequency side signal of the input signal and the sub-signal is a high frequency side signal of the input signal.

5. A signal recording method comprising the steps of:
   splitting the entire area of an input signal into a main area and a plurality of sub-areas;
   generating a main signal for the main area and a plurality of sub-signals for said sub-areas;
   setting priority for each of the sub-signals;
   finding an allowable signal area of the main signal in which noise superimposition does not affect the playback signal of the main signal;
   sequentially selecting the sub-signals synthesized to said main signal in the sequence of the decreasing priority within the range of the capacity of the allowable signal area; and
   synthesizing the selected sub-signal to the allowable signal area of the main signal for recording the main signal to which the sub-signal has been synthesized, wherein said input signal is a signal of a broad frequency range sampled at a sampling frequency higher than the sampling frequency of the main signal; and wherein the main signal is a low frequency side signal of the input signal and the sub-signal is a high frequency side signal of the input signal, wherein said input signal is a signal with a sampling frequency of 44.1 kHz or higher and with the number of quantization bits of 16.

6. A signal recording method comprising the steps of:
   splitting the entire area of an input signal into a main area and a plurality of sub-areas;
   generating a main signal for the main area and a plurality of sub-signals for said sub-areas;
   setting priority for each of the sub-signals;
   finding an allowable signal area of the main signal in which noise superimposition does not affect the playback signal of the main signal;
   sequentially selecting the sub-signals synthesized to said main signal in the sequence of the decreasing priority within the range of the capacity of the allowable signal area; and
   synthesizing the selected sub-signal to the allowable signal area of the main signal for recording the main signal to which the sub-signal has been synthesized, wherein said input signal is an enlarged dynamic range signal quantized with the number of quantization bits larger than the above-mentioned number of quantization bits of the main signal; and wherein the main signal is a portion of the input signal having a larger weight of quantization of the input signal and wherein the sub-signal is a portion of the input signal having a smaller weight of quantization of the input signal.

7. A signal recording method comprising the steps of:

splitting the entire area of an input signal into a main area and a plurality of sub-areas;

generating a main signal for the main area and a plurality of sub-signals for said sub-areas;

setting priority for each of the sub-signals;

finding an allowable signal area of the main signal in which noise superimposition does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal for recording the main signal to which the sub-signal has been synthesized, wherein said input signal is an enlarged dynamic range signal quantized with the number of quantization bits larger than the above-mentioned number of quantization bits of the main signal; and wherein the main signal is a portion of the input signal having a larger weight of quantization of the input signal and wherein the sub-signal is a portion of the input signal having a smaller weight of quantization of the input signal, wherein said input signal is a signal with a sampling frequency of 44.1 kHz and with the number of quantization bits of 16 or higher.

8. A signal recording method comprising the steps of:

splitting the entire area of an input signal into a main area and a plurality of sub-areas;

generating a main signal for the main area and a plurality of sub-signals for said sub-areas;

setting priority for each of the sub-signals;

finding an allowable signal area of the main signal in which noise superimposition does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal for recording the main signal to which the sub-signal has been synthesized, wherein the input signal is a broad frequency range signal sampled with a frequency higher than the sampling frequency of the main signal, said input signal being also an enlarged dynamic range signal quantized with the number of quantization bits larger than the above-mentioned number of quantization bits of the main signal; and wherein said main signal is the input signal portion with a low frequency range and a large weight of quantization, said sub-signal being the input signal portion with a high frequency range and a small weight of quantization.

9. A signal recording method comprising the steps of:

splitting the entire area of an input signal into a main area and a plurality of sub-areas;

generating a main signal for the main area and a plurality of sub-signals for said sub-areas;

setting priority for each of the sub-signals;

finding an allowable signal area of the main signal in which noise superimposition does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal for recording the main signal to which the sub-signal has been synthesized, wherein the input signal is a broad frequency range signal sampled with a frequency higher than the sampling frequency of the main signal, said input signal being also an enlarged dynamic range signal quantized with the number of quantization bits larger than the above-mentioned number of quantization bits of the main signal; and wherein said main signal is the input signal portion with a low frequency range and a large weight of quantization, said sub-signal being the input signal portion with a high frequency range and a small weight of quantization, wherein said input signal is a signal with a sampling frequency of 44.1 kHz or higher and with the number of quantization bits of 16 or larger.

10. The signal recording method as claimed in claim 1 wherein a higher priority is set for the sub-signal with a high frequency range.

11. The signal recording method as claimed in claim 1 wherein a higher priority is set for the sub-signal with a low frequency range.

12. The signal recording method as claimed in claim 1 wherein a higher priority is set for the sub-signal with a large weight of quantization.

13. The signal recording method as claimed in claim 1 wherein a higher priority is set for the sub-signal with a small weight of quantization.

14. The signal recording method, as claimed in claim 1 wherein a higher priority is set for the sub-signal having high correlation with the main signal, that is not prioritized.

15. The signal recording method as claimed in claim 1 wherein a higher priority is set for the sub-signal having low correlation with the main signal.

16. The signal recording method as claimed in claim 1 wherein a higher priority is set for the sub-signal having high entropy.

17. The signal recording method as claimed in claim 1 wherein a higher priority is set for the sub-signal having low entropy.

18. The signal recording method as claimed in claim 1 wherein a higher priority is set for the sub-signal having a large signal spectral energy.

19. The signal recording method as claimed in claim 1 wherein a higher priority is set for the sub-signal having a small signal spectral energy.

20. The signal recording method as claimed in claim 1 wherein a higher priority is set for the sub-signal of a long code length obtained on signal compression of the sub-signal.

21. The signal recording method as claimed in claim 1 wherein a higher priority is set for the sub-signal of a short code length obtained on signal compression of the sub-signal.

22. A signal recording method comprising the steps of:

partitioning an input signal in terms of pre-set time units for forming units;

splitting the entire area of the input signal in which the units have been formed into a main area and a plurality of sub-areas;

generating a main signal for the main area and a plurality of sub-signals for said sub-areas; setting priority to each sub-signal; finding an allowable signal area of the main signal noise superimposition on which does not affect the playback signal of the main signal; sequentially selecting the sub-signals synthesized to said main signal in the sequence of the decreasing priority within the range of the capacity of the allowable signal area; and synthesizing the selected sub-signal to the allowable signal area of the main signal having a smaller distance of the unit associated with the sub-signal for recording the main signal to which the sub-signal has been synthesized, wherein the synthesized selected sub-signal is variably scalable during the playback signal of the main signal.

23. The signal recording method as claimed in claim 22 wherein said priority is set within the sub-signal of a sole unit.

24. The signal recording method as claimed in claim 22 wherein said priority is set within the sub-signals of plural units.

25. The signal recording method as claimed in claim 22 wherein the distance of the unit is the difference of the signal readout sequence from the recording medium.

26. The signal recording method as claimed in claim 22 wherein the distance of the unit is the difference of the signal readout position on the recording medium.

27. The signal recording method as claimed in claim 22 wherein said input signal is an audio signal and wherein the allowable signal area of the main signal which does not affect the playback signal of the main signal on noise superimposition thereon is a psycho-acoustically non-deleterious signal area.

28. The signal recording method as claimed in claim 22 wherein said input signal is a video signal and wherein the allowable signal area of the main signal which does not affect the playback signal of the main signal on noise superimposition thereon is a visually non-deleterious signal area.

29. A signal recording method comprising the steps of:

partitioning an input signal in terms of pre-set time units for forming units;

splitting the entire area of the input signal in which the units have been formed into a main area and a plurality of subareas;

setting priority to each sub-signal;

generating a main signal for the main area and a plurality of sub-signals for said sub-areas;

finding an allowable signal area of the main signal noise superimposition on which does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal having a smaller distance of the unit associated with the sub-signal for recording the main signal to which the sub-signal has been synthesized, wherein said input signal is a signal of a broad frequency range sampled at a sampling frequency higher than the sampling frequency of the main signal; and wherein the main signal is a low frequency side signal of the input signal and the sub-signal is a high frequency side signal of the input signal.

30. A signal recording method comprising the steps of:

partitioning an input signal in terms of pre-set time units for forming units;

splitting the entire area of the input signal in which the units have been formed into a main area and a plurality of subareas;

setting priority to each sub-signal;

generating a main signal for the main area and a plurality of sub-signals for said sub-areas;

finding an allowable signal area of the main signal noise superimposition on which does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal having a smaller distance of the unit associated with the sub-signal for recording the main signal to which the sub-signal has been synthesized, wherein said input signal is a signal of a broad frequency range sampled at a sampling frequency higher than the sampling frequency of the main signal; and wherein the main signal is a low frequency side signal of the input signal and the sub-signal is a high frequency side signal of the input signal, wherein said input signal is a signal with a sampling frequency of 44.1 kHz or higher and with the number of quantization bits of 16.

31. A signal recording method comprising the steps of:

partitioning an input signal in terms of pre-set time units for forming units;

splitting the entire area of the input signal in which the units have been formed into a main area and a plurality of subareas;

setting priority to each sub-signal;

generating a main signal for the main area and a plurality of sub-signals for said sub-areas;

finding an allowable signal area of the main signal noise superimposition on which does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal having a smaller distance of the unit associated with the sub-signal for recording the main signal to which the sub-signal has been synthesized, wherein said input signal is an enlarged dynamic range signal quantized with the number of quantization bits larger than the above-mentioned number of quantization bits of the main signal; and wherein the main signal is a portion of the input signal having a larger weight of quantization of the input signal and wherein the sub-signal is a portion of the input signal having a smaller weight of quantization of the input signal.

32. A signal recording method comprising the steps of:

partitioning an input signal in terms of pre-set time units for forming units;

splitting the entire area of the input signal in which the units have been formed into a main area and a plurality of subareas;

setting priority to each sub-signal;

generating a main signal for the main area and a plurality of sub-signals for said sub-areas;

finding an allowable signal area of the main signal noise superimposition on which does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal having a smaller distance of the unit associated with the sub-signal for recording the main signal to which the sub-signal has been synthesized, wherein said input signal is an enlarged dynamic range signal quantized with the number of quantization bits larger than the above-mentioned number of quantization bits of the main signal; and wherein the main signal is a portion of the input signal having a larger weight of quantization of the input signal and wherein the sub-signal is a portion of the input signal having a smaller weight of quantization of the input signal, wherein said input signal is a signal with a sampling frequency of 44.1 kHz and with the number of quantization bits of 16 or higher.

33. A signal recording method comprising the steps of:

partitioning an input signal in terms of pre-set time units for forming units;

splitting the entire area of the input signal in which the units have been formed into a main area and a plurality of subareas;

setting priority to each sub-signal;

generating a main signal for the main area and a plurality of sub-signals for said sub-areas;

finding an allowable signal area of the main signal noise superimposition on which does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal having a smaller distance of the unit associated with the sub-signal for recording the main signal to which the sub-signal has been synthesized, wherein the input signal is a broad frequency range signal sampled with a frequency higher than the sampling frequency of the main signal, said input signal being also an enlarged dynamic range signal quantized with the number of quantization bits larger than the above-mentioned number of quantization bits of the main signal; and wherein said main signal is the input signal portion with a low frequency range and a large weight of quantization, said subsignal being the input signal portion with a high frequency range and a small weight of quantization.

34. A signal recording method comprising the steps of:

partitioning an input signal in terms of pre-set time units for forming units;

splitting the entire area of the input signal in which the units have been formed into a main area and a plurality of subareas;

setting priority to each sub-signal;

generating a main signal for the main area and a plurality of sub-signals for said sub-areas;

finding an allowable signal area of the main signal noise superimposition on which does not affect the playback signal of the main signal;

sequentially selecting the sub-signals synthesized to said main signal in the sequence of the decreasing priority within the range of the capacity of the allowable signal area; and synthesizing the selected sub-signal to the allowable signal area of the main signal having a smaller distance of the unit associated with the sub-signal for recording the main signal to which the sub-signal has been synthesized, wherein the input signal is a broad frequency range signal sampled with a frequency higher than the sampling frequency of the main signal, said input signal being also an enlarged dynamic range signal quantized with the number of quantization bits larger than the above-mentioned number of quantization bits of the main signal; and wherein said main signal is the input signal portion with a low frequency range and a large weight of quantization, said subsignal being the input signal portion with a high frequency range and a small weight of quantization, wherein said input signal is a signal with a sampling frequency of 44.1 kHz or higher and with the number of quantization bits of 16 or larger.

35. A signal recording apparatus comprising:

splitting means for splitting the entire area of an input signal into a main area and a plurality of sub-areas and for generating a main signal for the main area and a plurality of sub-signals for said sub-areas;

priority setting means for setting priority for each of the sub-signals of the sub-bands split by said splitting means;

allowable signal area calculating means for calculating, from the main signal as split by said splitting means, an allowable signal area of the main signal noise superimposition on which does not affect the playback signal of the main signal;

sub-signal selecting means for sequentially selecting the sub-signals synthesized in said allowable signal range in the decreasing sequence of the priority as set by said priority setting means within the range of the capacity of the allowable signal area as calculated by said allowable signal area calculating means; and recording means for synthesizing the sub-signal selected by said sub-signal selecting means to the allowable signal area of the main signal as calculated by the calculating means for calculating an allowable signal area of the main signal for recording the main signal to which the sub-signal has been synthesized, wherein the synthesized selected sub-signal is variably scalable during the playback signal of the main signal.

36. A signal recording apparatus comprising:

unit-forming means for partitioning an input signal in terms of pre-set time units for forming units;

splitting means for splitting the entire area of the input signal in which the units have been formed into a main area and a plurality of sub-areas for generating a main signal for the main area and a plurality of sub-signals for said sub-areas;

priority setting means for setting priority for each of the sub-signals split by said splitting means;

allowable signal area calculating means for calculating, from the main signal as split by said splitting means, an allowable signal area of the main signal noise superimposition on which does not affect the playback signal of the main signal;

sub-signal selecting means for sequentially selecting the sub-signals synthesized to said allowable signal area in the decreasing sequence of the priority as set by said priority setting means within the range of the capacity of the allowable signal area as calculated by said allowable signal area calculating means; and recording means for synthesizing the sub-signal selected by said sub-signal selecting means to the allowable signal area of the main signal as found by said allowable signal area calculating means for recording the main signal to which the sub-signal has been synthesized, said signal area having a smaller distance of the unit associated with the sub-signal.

37. A signal processing method comprising the steps of:

splitting the entire area of an input signal into a main area and a plurality of sub-areas;

generating a main signal for the main area and a plurality of sub-signals for said sub-areas;

setting priority for each of the sub-signals;

finding an allowable signal area in a signal area of the main signal noise superimposition on which does not affect the playback signal of the main signal;

sequentially selecting the sub-signals synthesized to said allowable signal area in the order of decreasing priority within the range of the capacity of the allowable signal area; and synthesizing the selected sub-signal to the allowable signal area of the main signal, wherein the synthesized selected sub-signal is variably scalable during the playback signal of the main signal.

38. A signal processing method comprising the steps of:

partitioning an input signal in terms of pre-set time units for forming units;

splitting the entire area of the input signal in which the units have been formed into a main area and a plurality of sub-areas for generating a main signal for the main area and a plurality of sub-signals for said sub-areas;

setting priority for each of the sub-signals;

finding an allowable signal area, in a signal area of the main signal, noise superimposition on which does not affect the playback signal of the main signal;

sequentially selecting the sub-signals synthesized to said allowable signal area in the sequence of the decreasing priority within the range of the capacity of the allowable signal area; and synthesizing the selected sub-signal to the allowable signal area of the main signal having a smaller distance of the unit associated with the sub-signal;

wherein the synthesized selected sub-signal is variably scalable during the playback signal of the main signal.

39. A data signal, comprising:

a main area segment comprising a first signal portion, said first signal portion having an allowable signal area in which noise superimposition does not affect the playback signal of the first signal portion; and a sub-area segment comprising a plurality of second signal portions, said second signal portions having predetermined relative priority, each of said second signal portions synthesized to said first signal portion in the sequence of decreasing priority within the range of said allowable signal area of said first signal portion, wherein the synthesized second signal portions are variably scalable during the playback signal of the main signal.

40. An audio signal, comprising:

a main area signal comprising a first signal portion, said first signal portion having an allowable signal area in which noise superimposition does not affect the playback signal of the first signal portion; and a sub-area segment comprising a plurality of second signal portions, said second signal portions having predetermined relative priority, each of said second signal portions synthesized to said first signal portion in the sequence of decreasing priority within the range of said allowable signal area of said first signal portion;

wherein said allowable signal area of said first signal portion which does not affect the playback signal of the first signal portion on noise superimposition thereon is a psycho-acoustically non-deleterious signal area, and wherein the synthesized second signal portions are variably scalable during the playback signal of the main signal.

41. A video signal, comprising:

a main area segment comprising a first signal portion, said first signal portion having an allowable signal area in which noise superimposition does not affect the playback signal of the first signal portion; and a sub-area segment comprising a plurality of second signal portions, said second signal portions having predetermined relative priority, each of said second signal portions synthesized to said first signal portion in the sequence of decreasing priority within the range of said allowable signal area of said first signal portion;

wherein said allowable signal area of said first signal portion which does not affect the playback signal of the first signal portion on noise superimposition thereon is a visually non-deleterious signal area, and wherein the synthesized second signal portions are variably scalable during the playback signal of the main signal.

42. A broad frequency range data signal, comprising:

a main area segment comprising a first signal portion, said first signal portion having an allowable signal area in which noise superimposition does not affect the playback signal of the first signal portion, said first signal portion sampled at a sampling frequency lower than the sampling frequency of the computer data signal and being a low frequency side-signal of said computer data signal; and a sub-area segment comprising a plurality of second signal portions, said second signal portions having predetermined relative priority, each of said second signal portions synthesized to said first signal portion in the sequence of decreasing priority within the range of said allowable signal area of said first signal portion, said second signal portions being high frequency side-signals of said computer data signal;

wherein the synthesized second signal portion is variably scalable during the playback signal of the first signal portion.

43. The data signal of claim 42, wherein said data signal is a signal with a sampling frequency of 44.1 kHz or higher and with the number of quantization bits of 16.

44. An enlarged dynamic range data signal, comprising:

a main area segment comprising a first signal portion, said first signal portion having an allowable signal area in which noise superimposition does not affect the playback signal of the first signal portion, said first signal portion quantized with a number of quantization bits lower than the number of quantization bits of the computer data signal; and a sub-area segment comprising a plurality of second signal portions, said second signal portions having predetermined relative priority, each of said second signal portions synthesized to said first signal portion in the sequence of decreasing priority within the range of said allowable signal area of said first signal portion;

wherein said first signal portion has a larger weight of quantization of the computer data signal and said second signal portions have a smaller weight of quantization of the computer data signal, and wherein reproduction of the first signal portion can be performed while maintaining device playback interchangability and wherein reproduction of the allowable signal area of the first signal portion to which the selected second signal portions have been synthesized results in improved sound quality of the first signal portion.

45. The data signal of claim 44, wherein said data signal is a signal with a sampling frequency of 44.1 kHz and with the number of quantization bits of 16 or higher.

46. A broad frequency range and enlarged dynamic range data signal, comprising:

a main area segment comprising a first signal portion, said first signal portion having an allowable signal area in which noise superimposition does not affect the playback signal of the first signal portion, said first signal portion sampled at a sampling frequency lower than the sampling frequency of the computer data signal and being a low frequency side-signal of said computer data signal, said first signal portion quantized with a number of quantization bits lower than the number of quantization bits of the computer data signal; and a sub-area segment comprising a plurality of second signal portions, said second signal portions having predetermined relative priority, each of said second signal portions synthesized to said first signal portion in the sequence of decreasing priority within the range of said allowable signal area of said first signal portion, said second signal portions being high frequency side-signals of said computer data signal;

wherein said first signal portion has a large weight of quantization and said second signal portions have a small weight of quantization; and further wherein the synthesized second signal portion is variably scalable during the playback signal of the first signal portion.

47. The data signal of claim 46, wherein said data signal is a signal with a sampling frequency of 44.1 kHz and with the number of quantization bits of 16 or higher.

48. The data signal of claim 39, wherein a higher priority is set for the second signal portions with a higher frequency range.

49. The data signal of claim 40, wherein a higher priority is set for the second signal portions with a higher frequency range.

50. The data signal of claim 41, wherein a higher priority is set for the second signal portions with a higher frequency range.

51. The data signal of claim 42, wherein a higher priority is set for the second signal portions with a higher frequency range.

52. The data signal of claim 44, wherein a higher priority is set for the second signal portions with a higher frequency range.

53. The data signal of claim 46, wherein a higher priority is set for the second signal portions with a higher frequency range.

54. The data signal of claim 39, wherein a higher priority is set for the second signal portions with a lower frequency range.

55. The data signal of claim 40, wherein a higher priority is set for the second signal portions with a lower frequency range.

56. The data signal of claim 41, wherein a higher priority is set for the second signal portions with a lower frequency range.

57. The data signal of claim 42, wherein a higher priority is set for the second signal portions with a lower frequency range.

58. The data signal of claim 44, wherein a higher priority is set for the second signal portions with a lower frequency range.

59. The data signal of claim 46, wherein a higher priority is set for the second signal portions with a lower frequency range.

60. The data signal of claim 39, wherein a higher priority is set for the second signal portions with a larger weight of quantization.

61. The data signal of claim 40, wherein a higher priority is set for the second signal portions with a larger weight of quantization.

62. The data signal of claim 41, wherein a higher priority is set for the second signal portions with a larger weight of quantization.

63. The data signal of claim 42, wherein a higher priority is set for the second signal portions with a larger weight of quantization.

64. The data signal of claim 44, wherein a higher priority is set for the second signal portions with a larger weight of quantization.

65. The data signal of claim 46, wherein a higher priority is set for the second signal portions with a larger weight of quantization.

66. The data signal of claim 39, wherein a higher priority is set for the second signal portions with a smaller weight of quantization.

67. The data signal of claim 40, wherein a higher priority is set for the second signal portions with a smaller weight of quantization.

68. The data signal of claim 41, wherein a higher priority is set for the second signal portions with a smaller weight of quantization.

69. The data signal of claim 42, wherein a higher priority is set for the second signal portions with a smaller weight of quantization.

70. The data signal of claim 44, wherein a higher priority is set for the second signal portions with a smaller weight of quantization.

71. The data signal of claim 46, wherein a higher priority is set for the second signal portions with a smaller weight of quantization.

72. The data signal of claim 39, wherein a higher priority is set for the second signal portions having a higher correlation with said first signal portion.

73. The data signal of claim 40, wherein a higher priority is set for the second signal portions having a higher correlation with said first signal portion.

74. The data signal of claim 41, wherein a higher priority is set for the second signal portions having a higher correlation with said first signal portion.

75. The data signal of claim 42, wherein a higher priority is set for the second signal portions having a higher correlation with said first signal portion.

76. The data signal of claim 44, wherein a higher priority is set for the second signal portions having a higher correlation with said first signal portion.

77. The data signal of claim 46, wherein a higher priority is set for the second signal having a higher correlation with said first signal portion.

78. The data signal of claim 39, wherein a higher priority is set for the second signal portions having a lower correlation with said first signal portion.

79. The data signal of claim 40, wherein a higher priority is set for the second signal portions having a lower correlation with said first signal portion.

80. The data signal of claim 41, wherein a higher priority is set for the second signal portions having a lower correlation with said first signal portion.

81. The data signal of claim 42, wherein a higher priority is set for the second signal portions having a lower correlation with said first signal portion.

82. The data signal of claim 44, wherein a higher priority is set for the second signal portions having a lower correlation with said first signal portion.

83. The data signal of claim 46, wherein a higher priority is set for the second signal having a lower correlation with said first signal portion.

84. The data signal of claim 39, wherein a higher priority is set for the second signal portions having a higher entropy.

85. The data signal of claim 40, wherein a higher priority is set for the second signal portions having a higher entropy.

86. The data signal of claim 41, wherein a higher priority is set for the second signal portions having a higher entropy.

87. The data signal of claim 42, wherein a higher priority is set for the second signal portions having a higher entropy.

88. The data signal of claim 44, wherein a higher priority is set for the second signal portions having a higher entropy.

89. The data signal of claim 46, wherein a higher priority is set for the second signal portions having a higher entropy.

90. The data signal of claim 39, wherein a higher priority is set for the second signal portions having a lower entropy.

91. The data signal of claim 40, wherein a higher priority is set for the second signal portions having a lower entropy.

92. The data signal of claim 41, wherein a higher priority is set for the second signal portions having a lower entropy.

93. The data signal of claim 42, wherein a higher priority is set for the second signal portions having a lower entropy.

94. The data signal of claim 44, wherein a higher priority is set for the second signal portions having a lower entropy.

95. The data signal of claim 46, wherein a higher priority is set for the second signal portions having a lower entropy.

96. The data signal of claim 39, wherein a higher priority is set for the second signal portions having a large signal spectral energy.

97. The data signal of claim 40, wherein a higher priority is set for the second signal portions having a large signal spectral energy.

98. The data signal of claim 41, wherein a higher priority is set for the second signal portions having a large signal spectral energy.

99. The data signal of claim 42, wherein a higher priority is set for the second signal portions having a large signal spectral energy.

100. The data signal of claim 44, wherein a higher priority is set for the second signal portions having a large signal spectral energy.

101. The data signal of claim 46, wherein a higher priority is set for the second signal portions having a large signal spectral energy.

102. The data signal of claim 39, wherein a higher priority is set for the second signal portions having a small signal spectral energy.

103. The data signal of claim 40, wherein a higher priority is set for the second signal portions having a small signal spectral energy.

104. The data signal of claim 41, wherein a higher priority is set for the second signal portions having a small signal spectral energy.

105. The data signal of claim 42, wherein a higher priority is set for the second signal portions having a small signal spectral energy.

106. The data signal of claim 44, wherein a higher priority is set for the second signal portions having a small signal spectral energy.

107. The data signal of claim 46, wherein a higher priority is set for the second signal portions having a small signal spectral energy.

108. The data signal of claim 39, wherein a higher priority is set for the second signal portions having a longer code length obtained on signal compression of said second signal portions.

109. The data signal of claim 40, wherein a higher priority is set for the second signal portions having a longer code length obtained on signal compression of said second signal portions.

110. The data signal of claim 41, wherein a higher priority is set for the second signal portions having a longer code length obtained on signal compression of said second signal portions.

111. The data signal of claim 42, wherein a higher priority is set for the second signal portions having a longer code length obtained on signal compression of said second signal portions.

112. The data signal of claim 44, wherein a higher priority is set for the second signal portions having a longer code length obtained on signal compression of said second signal portions.

113. The data signal of claim 46, wherein a higher priority is set for the second signal portions having a longer code length obtained on signal compression of said second signal portions.

114. The data signal of claim 39, wherein a higher priority is set for the second signal portions having a shorter code length obtained on signal compression of said second signal portions.

115. The data signal of claim 40, wherein a higher priority is set for the second signal portions having a shorter code length obtained on signal compression of said second signal portions.

116. The data signal of claim 41, wherein a higher priority is set for the second signal portions having a shorter code length obtained on signal compression of said second signal portions.

117. The data signal of claim 42, wherein a higher priority is set for the second signal portions having a shorter code length obtained on signal compression of said second signal portions.

118. The data signal of claim 44, wherein a higher priority is set for the second signal portions having a shorter code length obtained on signal compression of said second signal portions.

119. The data signal of claim 46, wherein a higher priority is set for the second signal portions having a shorter code length obtained on signal compression of said second signal portions.

120. A signal recording method comprising the steps of:
   splitting the entire area of an input signal into a main area and a plurality of sub-areas;
   generating a main signal for the main area and a plurality of sub-signals for said sub-areas;
   setting priority for each of the sub-signals;
   finding an allowable signal area of the main signal in which noise superimposition does not affect the playback signal of the main signal;

sequentially selecting the sub-signals synthesized to said main signal in the sequence of the decreasing priority within the range of the capacity of the allowable signal area; and synthesyzing the selected sub-signals to the allowable signal area of the main signal for recording the main signal to which the sub-signals have been synthesized, wherein reproduction of the main signal can be performed while maintaining device playback interchangability and wherein reproduction of the allowable signal area of the main signal to which the selected sub-signals have been synthesized results in improved sound quality of the main signal.

121. The signal recording method, as claimed in claim 120 wherein a higher priority is set for the sub-signal having high correlation with the main signal, that is not prioritized.

122. A signal recording method comprising the steps of:

partitioning an input signal in terms of pre-set time units for forming units;

splitting the entire area of the input signal in which the units have been formed into a main area and a plurality of sub-areas;

generating a main signal for the main area and a plurality of sub-signals for said sub-areas;

setting priority to each sub-signal;

finding an allowable signal area of the main signal in which noise superimposition does not affect the playback signal of the main signal;

sequentially selecting the sub-signals synthesized to said main signal in the sequence of the decreasing priority within the range of the capacity of the allowable signal area; and synthesizing the selected sub-signals to the allowable signal area of the main signal having a smaller distance of the unit associated with the sub-signals for recording the main signal to which the sub-signals have been synthesized, wherein reproduction of the main signal can be performed while maintaining device playback interchangability and wherein reproduction of the allowable signal area of the main signal to which the selected sub-signals have been synthesized results in improved sound quality of the main signal.

123. A signal recording apparatus comprising:

splitting means for splitting the entire area of an input signal into a main area and a plurality of sub-areas and for generating a main signal for the main area and a plurality of sub-signals for said sub-areas;

priority setting means for setting priority for each of the sub-signals of the sub-bands split by said splitting means;

allowable signal area calculating means for calculating, from the main signal as split by said splitting means, an allowable signal area of the main signal noise superimposition on which does not affect the playback signal of the main signal;

sub-signal selecting means for sequentially selecting the sub-signals synthesized in said allowable signal range in the decreasing sequence of the priority as set by said priority setting means within the range of the capacity of the allowable signal area as calculated by said allowable signal area calculating means; and recording means for synthesizing the sub-signal selected by said sub-signal selecting means to the allowable signal area of the main signal as calculated by the calculating means for calculating an allowable signal area of the main signal for recording the main signal to which the sub-signal has been synthesized, wherein reproduction of the main signal can be performed while maintaining device playback interchangability and wherein reproduction of the allowable signal area of the main signal to which the selected sub-signals have been synthesized results in improved sound quality of the main signal.

124. A signal recording apparatus, comprising:

unit-forming means for partitioning an input signal in terms of pre-set time units for forming units;

splitting means for splitting the entire area of the input signal in which the units have been formed into a main area and a plurality of sub-areas for generating a main signal for the main area and a plurality of sub-signals for said sub-area;

priority setting means for setting priority for each of the sub-signals split by said splitting means;

allowable signal area calculating means for calculating, from the main signal as split by said splitting means, an allowable signal area of the main signal noise superimposition on which does not affect the playback signal of the main signal;

sub-signal selecting means for sequentially selecting the sub-signals synthesized in said allowable signal area in the decreasing sequence of the priority as set by said priority setting means within the range of the capacity of the allowable signal area as calculated by said allowable signal area calculating means; and recording means for synthesizing the sub-signal selected by said sub-signal selecting means to the allowable signal area of the main signal as found by said allowable signal area calculating means for recording the main signal to which the sub-signal has been synthesized, said signal area having a smaller distance of the unit associated with the sub-signal, wherein reproduction of the main signal can be performed while maintaining device playback interchangability and wherein reproduction of the allowable signal area of the main signal to which the selected sub-signals have been synthesized results in improved sound quality of the main signal.

125. A signal processing method comprising the steps of:

splitting the entire area of an input signal into a main area and a plurality of sub-areas;

generating a main signal for the main area and a plurality of sub-signals for said sub-areas;

setting priority for each of the sub-signals;

finding an allowable signal area in a signal area of the main signal noise superimposition on which does not affect the playback signal of the main signal;

sequentially selecting the sub-signals synthesized to said allowable signal area in the order of decreasing priority within the range of the capacity of the allowable signal area; and synthesizing the selected sub-signal to the allowable signal area of the main signal, wherein reproduction of the main signal can be performed while maintaining device playback interchangability and wherein reproduction of the allowable signal area of the main signal to which the selected sub-signals have been synthesized results in improved sound quality of the main signal.

126. A signal processing method comprising the steps of:

partitioning an input signal in terms of pre-set time units for forming units;

splitting the entire area of the input signal in which the units have been formed into a main area and a plurality of sub-areas for generating a main signal for the main area and a plurality of sub-signals for said sub-areas;

setting priority for each of the sub-signals;

finding an allowable signal area, in a signal area of the main signal, noise superimposition on which does not affect the playback signal of the main signal;

sequentially selecting the sub-signals synthesized to said allowable signal area in the sequence of the decreasing priority within the range of the capacity of the allowable signal area; and synthesizing the selected sub-signal to the allowable signal area of the main signal having a smaller distance of the unit associated with the sub-signal, wherein reproduction of the main signal can be performed while maintaining device playback interchangability and wherein reproduction of the allowable signal area of the main signal to which the selected sub-signals have been synthesized results in improved sound quality of the main signal.

127. A data signal, comprising:

a main area segment comprising a first signal portion, said first signal portion having an allowable signal area in which noise superimposition does not affect the playback signal of the first signal portion; and a sub-area segment comprising a plurality of second signals portions, said second signal portions having predetermined relative priority, each of said second signal portions synthesized to said first signal portion in the sequence of decreasing priority within the range of said allowable signal area of said first signal portion, wherein reproduction of the first signal portion can be performed while maintaining device playback interchangability and wherein reproduction of the allowable signal area of the first signal portion to which the selected second signal portions have been synthesized results in improved sound quality of the first signal portion.

128. An audio signal, comprising:

a main area signal comprising a first signal portion, said first signal portion having an allowable signal area in which noise superimposition does not affect the playback signal of the first signal portion; and a sub-area segment comprising a plurality of second signal portions, said second signal portions having predetermined relative priority, each of said second signal portions synthesized to said first signal portion in the sequence of decreasing priority within the range of said allowable signal area of said first signal portion;

wherein said allowable signal area of said first signal portion which does not affect the playback signal of the first signal portion on noise superimposition thereon is a psycho-acoustically non-deleterious signal area, and wherein reproduction of the first signal portion can be performed while maintaining device playback interchangability and wherein reproduction of the allowable signal area of the first signal portion to which the selected second signal portions have been synthesized results in improved sound quality of the first signal portion.

129. A video signal, comprising:

a main area segment comprising a first signal portion, said first signal portion having an allowable signal area in which noise superimposition does not affect the playback signal of the first signal portion; and a sub-area segment comprising a plurality of second signal portions, said second signal portions having predetermined relative priority, each of said second signal portions synthesized to said first signal portion in the sequence of decreasing priority within the range of said allowable signal area of said first signal portion;

wherein said allowable signal area of said first signal portion which does not affect the playback signal of the first signal portion on noise superimposition thereon is a visually non-deleterious signal area, and wherein reproduction of the first signal portion can be performed while maintaining device playback interchangability and wherein reproduction of the allowable signal area of the first signal portion to which the selected second signal portions have been synthesized results in improved sound quality of the first signal portion.

* * * * *